United States Patent
Bacic

(10) Patent No.: US 9,249,729 B2
(45) Date of Patent: Feb. 2, 2016

(54) TURBINE COMPONENT COOLING WITH CLOSED LOOPED CONTROL OF COOLANT FLOW

(71) Applicant: ROLLS-ROYCE PLC, London (GB)

(72) Inventor: Marko Bacic, Oxford (GB)

(73) Assignee: ROLLS-ROYCE plc, London (GB)

( * ) Notice: Subject to any disclaimer, the term of this patent is extended or adjusted under 35 U.S.C. 154(b) by 481 days.

(21) Appl. No.: 13/682,280

(22) Filed: Nov. 20, 2012

(65) Prior Publication Data

US 2013/0152602 A1    Jun. 20, 2013

(30) Foreign Application Priority Data

Dec. 14, 2011   (GB) .................................... 1121428.5

(51) Int. Cl.
*F01D 11/24*    (2006.01)
*F01D 17/02*    (2006.01)
(Continued)

(52) U.S. Cl.
CPC . *F02C 7/185* (2013.01); *F01D 5/08* (2013.01); *F01D 5/081* (2013.01); *F01D 5/082* (2013.01); *F01D 5/085* (2013.01); *F01D 5/087* (2013.01); *F01D 5/088* (2013.01); *F01D 11/24* (2013.01);
(Continued)

(58) Field of Classification Search
CPC .............. F02C 7/125; F02C 7/18; F02C 3/13; F02C 9/18; F02C 6/08; F02C 7/12; F02C 7/185; F01D 17/02; F01D 17/085; F01D 5/08; F01D 5/082; F01D 5/084; F01D 5/085; F01D 5/087; F01D 5/088; F01D 11/24; F05D 2260/213; F05D 2270/303; F05D 2270/3032

See application file for complete search history.

(56) References Cited

U.S. PATENT DOCUMENTS

| 4,254,618 A | * | 3/1981 | Elovic | ..................... F02C 7/185 60/226.1 |
|---|---|---|---|---|
| 4,999,991 A | | 3/1991 | Haddad et al. | |

(Continued)

FOREIGN PATENT DOCUMENTS

| EP | 0231952 A2 | 8/1987 |
|---|---|---|
| EP | 1923539 A2 | 5/2008 |

(Continued)

OTHER PUBLICATIONS

Kim et. al "Feedback Control", 2010, http://controls.engin.umich.edu/wiki/index.php/Feedback_control.*

(Continued)

*Primary Examiner* — Phutthiwat Wongwian
*Assistant Examiner* — William Breazeal
(74) *Attorney, Agent, or Firm* — Oliff PLC

(57) ABSTRACT

A gas turbine engine has, in flow series, a compressor section, a combustor, and a turbine section. The engine further has a cooling system which diverts a cooling air flow received from the compressor section to a heat exchanger and then to the turbine section to cool a component thereof. The cooling air flow by-passes the combustor and is cooled in the heat exchanger. The cooling system has a valve arrangement which regulates the cooling air flow. The engine further has a closed-loop controller which estimates and/or measures one or more temperatures of the cooled component, compares values derived from the estimated and/or measured temperatures with one or more corresponding targets, and issues a demand signal to the valve arrangement based on the comparison and a value of the demand signal at a previous time step.

10 Claims, 6 Drawing Sheets

(51) Int. Cl.
*F01D 17/08* (2006.01)
*F01D 5/08* (2006.01)
*F02C 3/13* (2006.01)
*F02C 7/12* (2006.01)
*F02C 7/18* (2006.01)
*F02C 9/18* (2006.01)
*F02C 6/08* (2006.01)

(52) U.S. Cl.
CPC .............. *F01D 17/02* (2013.01); *F01D 17/085* (2013.01); *F02C 3/13* (2013.01); *F02C 6/08* (2013.01); *F02C 7/12* (2013.01); *F02C 7/125* (2013.01); *F02C 9/18* (2013.01); *F05D 2260/213* (2013.01); *F05D 2260/81* (2013.01); *F05D 2270/112* (2013.01); *F05D 2270/114* (2013.01); *F05D 2270/303* (2013.01); *F05D 2270/3032* (2013.01); *F05D 2270/44* (2013.01); *Y02T 50/675* (2013.01)

(56) References Cited

U.S. PATENT DOCUMENTS

| | | | |
|---|---|---|---|
| 5,224,332 A | | 7/1993 | Schwarz et al. |
| 6,584,778 B1 * | | 7/2003 | Griffiths et al. ................. 60/782 |
| 6,792,762 B1 * | | 9/2004 | Yamanaka ............... F02C 7/185 |
| | | | 415/115 |
| 8,015,824 B2 * | | 9/2011 | Vedhagiri et al. ................ 60/782 |
| 8,538,561 B2 * | | 9/2013 | Kumar .................. G05B 13/048 |
| | | | 700/288 |
| 2004/0000144 A1 * | | 1/2004 | Rajamani .................. F02C 9/28 |
| | | | 60/772 |
| 2008/0063509 A1 * | | 3/2008 | Sutherland ............... F01D 11/24 |
| | | | 415/14 |
| 2009/0226301 A1 * | | 9/2009 | Priestman ................. F15C 1/02 |
| | | | 415/145 |
| 2010/0286889 A1 | | 11/2010 | Childers |
| 2013/0152601 A1 * | | 6/2013 | Bacic .............................. 60/782 |
| 2014/0126991 A1 * | | 5/2014 | Ekanayake ............. F02C 7/143 |
| | | | 415/1 |

FOREIGN PATENT DOCUMENTS

| | | |
|---|---|---|
| EP | 1988260 A2 | 11/2008 |
| EP | 2 119 892 A2 | 11/2009 |

OTHER PUBLICATIONS

Jan. 28, 2015 Search Report issued in European Application No. 12193315.
Search Report issued in British Application No. 1121428.5 dated Apr. 2, 2012.

* cited by examiner (a)

(b)

TURBINE COMPONENT COOLING WITH CLOSED LOOPED CONTROL OF COOLANT FLOW

FIELD OF THE INVENTION

The present invention relates to a closed-loop controller, and, in particular, to a gas turbine engine having a system including such a controller for cooling the turbine section of the gas turbine.

BACKGROUND OF THE INVENTION

With reference to FIG. 1, a ducted fan gas turbine engine generally indicated at 10 has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

The high pressure turbine components of an aero gas turbine engine are located in the hottest part of the engine. At around 1600° C., the temperature of the gas stream is greater than the melting temperature of the nickel-based alloys from which the high pressure turbine nozzle guide vanes and rotor blades are typically cast.

It is usual, therefore, to cool nozzle guide vanes and rotor blades internally using cooling air taken from the exit of the high pressure compressor. The cooling air, which bypasses the combustor, may nonetheless be at a temperature of over 700° C. on exit from the compressor section. However, the cooling air, even if returned into the flow path of the turbine downstream of the combustor, does not return a full measure of work to the operation of the turbine. Thus, the greater the amount of cooling air that is extracted, the greater the associated loss in engine efficiency.

One method of reducing the cooling air requirement is to cool the cooling air before it enters the high pressure turbine components. This can be achieved by putting the cooling air in heat exchange relationship with a cooler fluid. For example, many aero gas turbine engines have a bypass air stream which can serve as the cooler fluid. In conventional arrangements, a portion of that air stream is diverted at an offtake into a duct in which the heat exchanger is located. The diverted portion of air, after having passed over the heat exchanger, is then returned to the main bypass air stream.

U.S. Pat. No. 4,254,618 proposes bleeding cooling air from the compressor discharge of a turbofan engine, and routing the cooling air to a heat exchanger located in a diffuser section of the fan duct. The cooled cooling air is then routed through compressor rear frame struts to an expander nozzle and thence to the turbine.

SUMMARY OF THE INVENTION

It would be desirable to increase the efficiency of engines have cooled cooling air systems.

The present invention is at least partly based on a recognition that cooled cooling air systems can be operated more efficiently by taking account of temperatures and/or stresses in the cooled turbine section component.

Accordingly, in a first aspect, the present invention provides a gas turbine engine having, in flow series, a compressor section, a combustor, and a turbine section, and further having:

- a cooling system which diverts a cooling air flow received from the compressor section to a heat exchanger and then to the turbine section to cool a component thereof, the cooling air flow by-passing the combustor and being cooled in the heat exchanger, and the cooling system having a valve arrangement which regulates the cooling air flow; and
- a closed-loop controller which estimates and/or measures one or more temperatures of the cooled component, compares values derived from the estimated and/or measured temperatures with one or more corresponding targets, and issues a demand signal to the valve arrangement based on the comparison and a value of the demand signal at a previous time step.

Advantageously, by controlling the cooled cooling air on the basis of such a comparison, the cooled cooling air can be used in a highly efficient manner, thereby improving the overall engine efficiency and/or reducing component temperatures and/or stresses.

In a second aspect, the present invention provides the closed-loop controller of the first aspect.

Optional features of the invention will now be set out. These are applicable singly or in any combination with any of the above aspects of the invention.

Typically, the demand signal may be determined on the basis of the comparison and values of the demand signal at plural previous time steps. Indeed, the determination can further be on the basis of plural comparisons, for example at the present time and at previous time steps.

When the closed-loop controller measures the temperature of the cooled component, the engine further may have one or more temperature measuring devices, such as one or more pyrometers or thermocouples, adapted to measure the temperature of the component at one or more locations thereof.

Alternatively or additionally, the engine may further have one or more temperature measuring devices, such as thermocouples, adapted to measure at least the temperature of the cooled cooling air and the temperature of the air exiting the compressor section, the closed-loop controller estimating the temperature of the cooled component on the basis of at least the measured temperature of the cooled cooling air and the measured temperature of the air exiting the compressor section.

According to one option, the closed-loop controller may compare the values of the estimated or measured temperatures with one or more corresponding target temperatures.

However, according to another option, the closed-loop controller may calculate one or more stresses in the cooled component based on the estimated and/or measured temperatures, and compare the values of the calculated stresses with one or more corresponding target stresses.

When the closed-loop controller calculates one or more stresses in the cooled component, it may use a reduced order model to calculate the stresses in the component from the estimated and/or measured temperatures. In this way, the stress calculation can be made computationally less intensive, and thus more tractable in real-time.

Preferably, the cooled turbine section component is a turbine disc.

Preferably, the valve arrangement includes one or more switched vortex valves.

Preferably, the heat exchanger is located in a bypass air stream of the engine, such as in the fan duct of a turbofan engine.

In a third aspect, the present invention provides a method of operating a gas turbine engine having, in flow series, a compressor section, a combustor, and a turbine section, the method including the steps of:

diverting a cooling air flow received from the compressor section to a heat exchanger and then to the turbine section to cool a component thereof, the cooling air flow by-passing the combustor and being cooled in the heat exchanger;

estimating and/or measuring one or more temperatures of the cooled component; comparing values derived from the estimated and/or measured temperatures with one or more corresponding targets; and issuing a demand signal to the valve arrangement based on the comparison and a value of the demand signal at a previous time step.

The method of the third aspect thus corresponds to the gas turbine engine of the first aspect, and can be performed using that engine. Optional features of the first aspect are applicable singly or in any combination with the third aspect of the invention.

For example, according to one option, the comparing step may include comparing the values of the estimated and/or measured temperatures with one or more corresponding target temperatures. According to another option, the method may further include a step of calculating one or more stresses in the cooled component based on the estimated and/or measured temperatures, and the comparing step may include comparing the values of the calculated stresses with one or more corresponding target stresses.

Further optional features of the invention are set out below.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
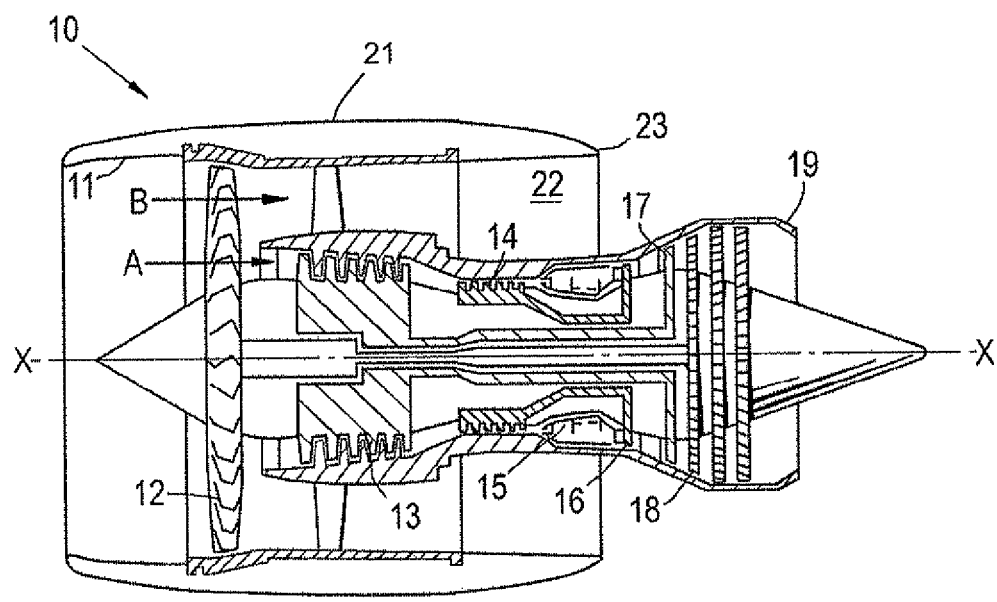
FIG. 1 shows a schematic longitudinal cross-section through a ducted fan gas turbine engine.
Figure 2:
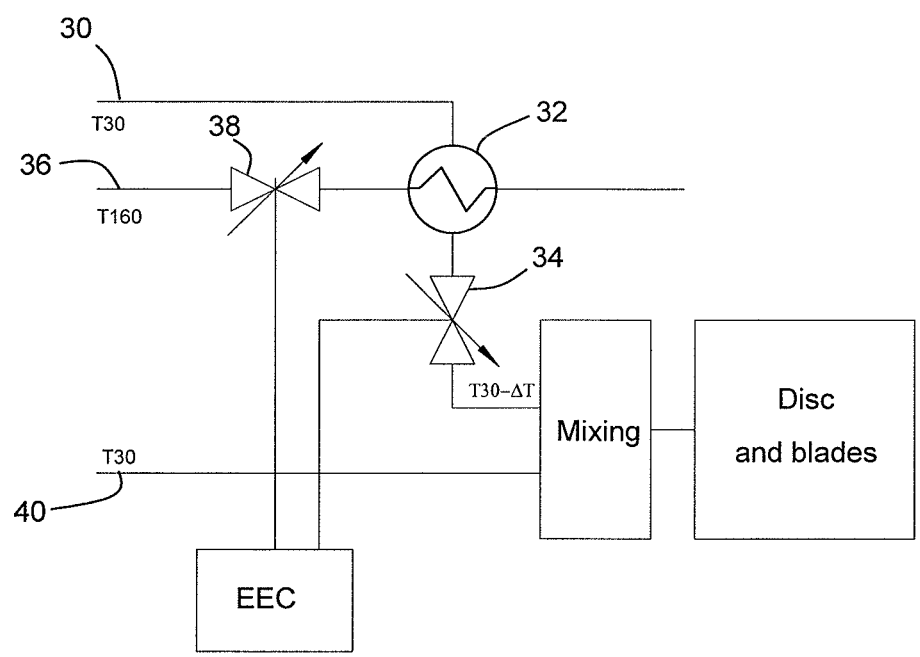
FIG. 2 shows schematically a conventional system for cooling the high pressure turbine of a turbofan engine using cooled cooling air.

FIG. 2 shows schematically a conventional system for cooling the high pressure turbine of a turbofan engine using cooled cooling air. The system diverts a portion 30 of the high pressure (HP) compressed air exiting of the compressor section at a temperature T30 to one side of a heat exchanger 32 which is located in a side channel of the fan duct. The flow rate of the diverted compressed air is controlled by valve 34. Low pressure (LP) cooling air 36 at temperature T160 travelling through the fan duct can also be diverted, under the control of valve 38, into the side channel and over the other side of the heat exchanger. This cooling air cools the diverted compressed air (hereafter the "cooled cooling air") by an amount $\Delta T$.

The cooled cooling air is mixed (typically inboard of the combustor) with further portions 40 of the compressed air exiting of the compressor section (at a temperature T30), and then used to cool the high pressure turbine disc and blades. The flow rate and the temperature of the cooled cooling air are thus determined by the valves 34, 38, with the settings of the valves 34, 38 being under the control of the engine electronic controller (EEC).

These settings can be derived using engine performance decks. However, a disadvantage of this approach is that the overall system is open-loop. The valve scheduling maps are typically derived based on the performance of a mean new engine using a nominal flight cycle. This leads to sub-optimal scheduling for an in-service engine, which may not fly the nominal flight cycle, and which, with time in service, departs from the performance of the mean new engine. The sub-optimal valve scheduling can ultimately reduce disc life.

The present invention thus provides a different, closed-loop, approach to cooled cooling air control. In a first embodiment, the engine has a cooling system similar to that shown in FIG. 2, but in place of the conventional EEC control of FIG. 2, the system has a closed loop controller as shown schematically in FIG. 3A. The closed-loop controller employs a mean disc temperature sensor 50. This can take the form of a pyrometer measuring a point temperature on the disc, and a processing unit which applies a predetermined functional correlation to convert the point temperature to a mean temperature.

Next, the measured temperature is compared in a comparator 54 with corresponding desired temperature target, which is typically calculated off-line as a function of, for example, engine power, altitude, ambient temperature and Mach number. The resulting error value is sent to a control unit 56, which determines therefrom appropriate demand signals to be sent to the valves controlling the flow rates of the HP compressed air and LP cooling air sent to the heat exchanger according to engine conditions to control disc temperatures.

Figure 3:
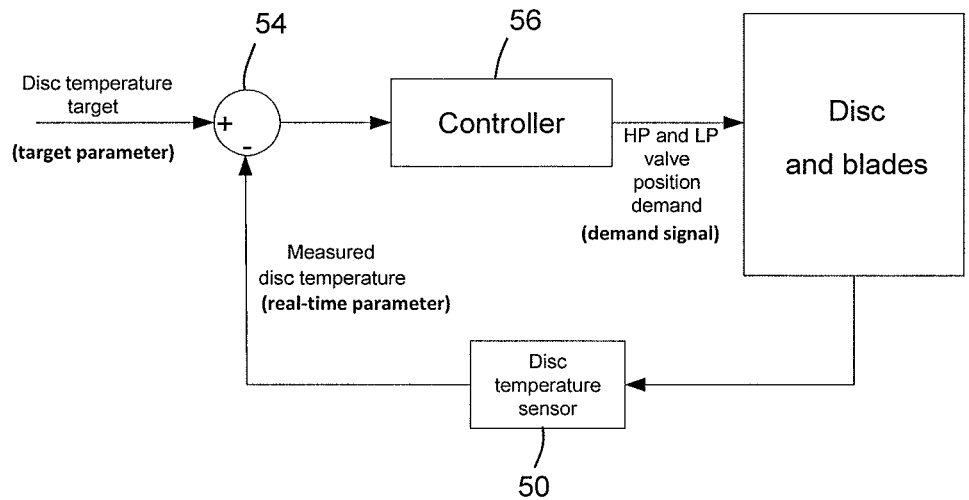
FIG. 3A and FIG. 3B show schematically closed-loop controllers according to first and second embodiments of the present invention.
Figure 3:
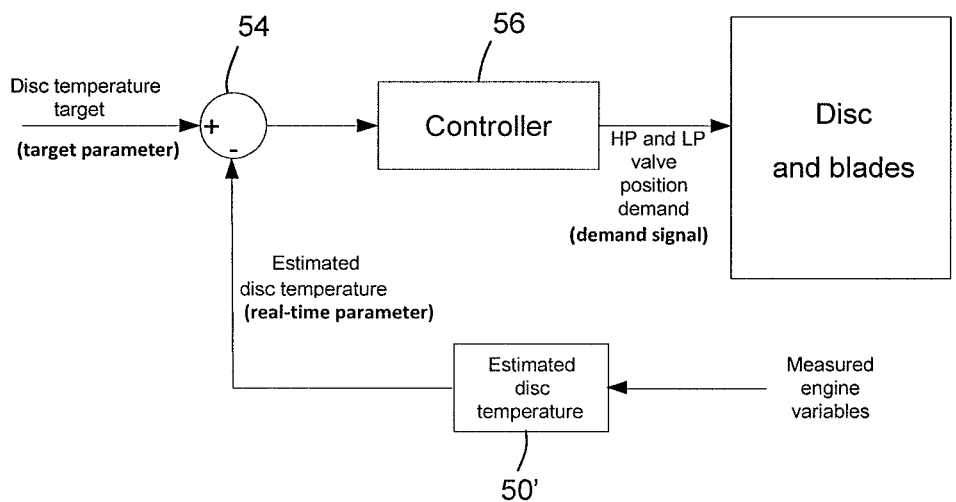

The demand signals can be calculated in the control unit 56 by defining a transfer function that acts on the error. However, the control unit implements closed-loop multivariable control. Thus the demand signals issued by the control unit at previous time steps are also used by the unit to determine the current demand signals. The control unit can implement a simple PI controller or a more sophisticated transfer function of a type known to the skilled person FIG. 3B shows schematically a closed loop controller according to a second embodiment. The second embodiment differs from the first embodiment by measuring engine variables from which the disc temperature can be estimated in an estimating unit 50' rather than measuring the disc temperature directly. Thus, for example, thermocouples can measure at least the temperatures: (i) $T_{HX}$ of the flow of cooled cooling air exiting the heat exchanger, (ii) $T_{30}$ of the flow of high pressure air exiting the compressor section, and (iii) $T_{26}$ of the flow of inlet air to the HP compressor (some of which flow is diverted to cool the disc bore). Typically the two air flows (i) and (ii) are mixed in different proportions in two air streams by respective pre-swirler nozzles (A and B) before being used to cool the high pressure turbine disc and blades. For each pre-swirler nozzle, the measured temperatures $T_{HX}$ and $T_{30}$ can be functionally correlated with e.g. the high pressure turbine speed $N_3$ and the altitude ALT to provide the temperatures $T_A$, $T_B$ of the respective resultant coolant flows:

$$T_A = f(T_{HX}, T_{30}, N_3, ALT)$$

$$T_B = g(T_{HX}, T_{30}, N_3, ALT)$$

The coolant flows from both the pre-swirler nozzles and the flow (iii) impinge on the turbine disc and can thus be used in a pre-determined correlation to compute the real-time actual mean disc temperature $T_{disc}$:

$$T_{disc} = F(T_A, T_B, T_{30}, T_{26}, N_3, ALT)$$

Other engine parameters and measured variables can also be used to estimate a mean disc temperature. The functional relations f, g and F are, in general, not simply algebraic equations of input parameters, but rather sets of dynamic differential equations that relate the time variation of the inputs to the mean disc temperature, i.e. the functions f, g and F are normally state-space models of types known to the skilled person.

It is also possible to combine the approaches of the first and second embodiments so that the disc temperature is determined from both direct and indirect measurements.

The estimated mean temperature is then used in a disc stress calculator unit 52 to calculate one or more stresses in the disc based on the estimated mean temperature. The stress calculation is discussed further below.

Next, the calculated stresses are compared in a comparator 54 with corresponding desired stress targets, which are typically calculated off-line as a function of, for example, engine power, altitude, ambient temperature and Mach number. The resulting one or more error values are sent to a control unit 56, which determines therefrom appropriate demand signals to be sent to the valves controlling the flow rates of the HP compressed air and LP cooling air sent to the heat exchanger.

Figure 4:
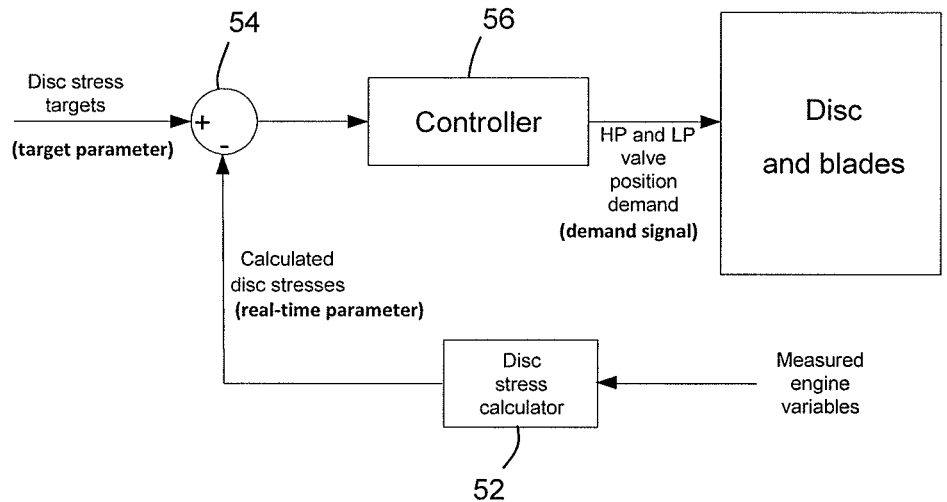
FIG. 4 shows schematically closed-loop controllers according to a third embodiment of the present invention.
Figure 5:
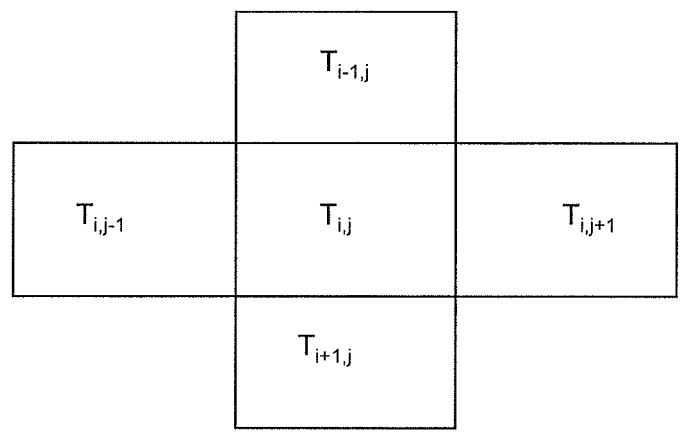
FIG. 5 shows schematically a volume element of a discretized turbine disc.
Figure 6:
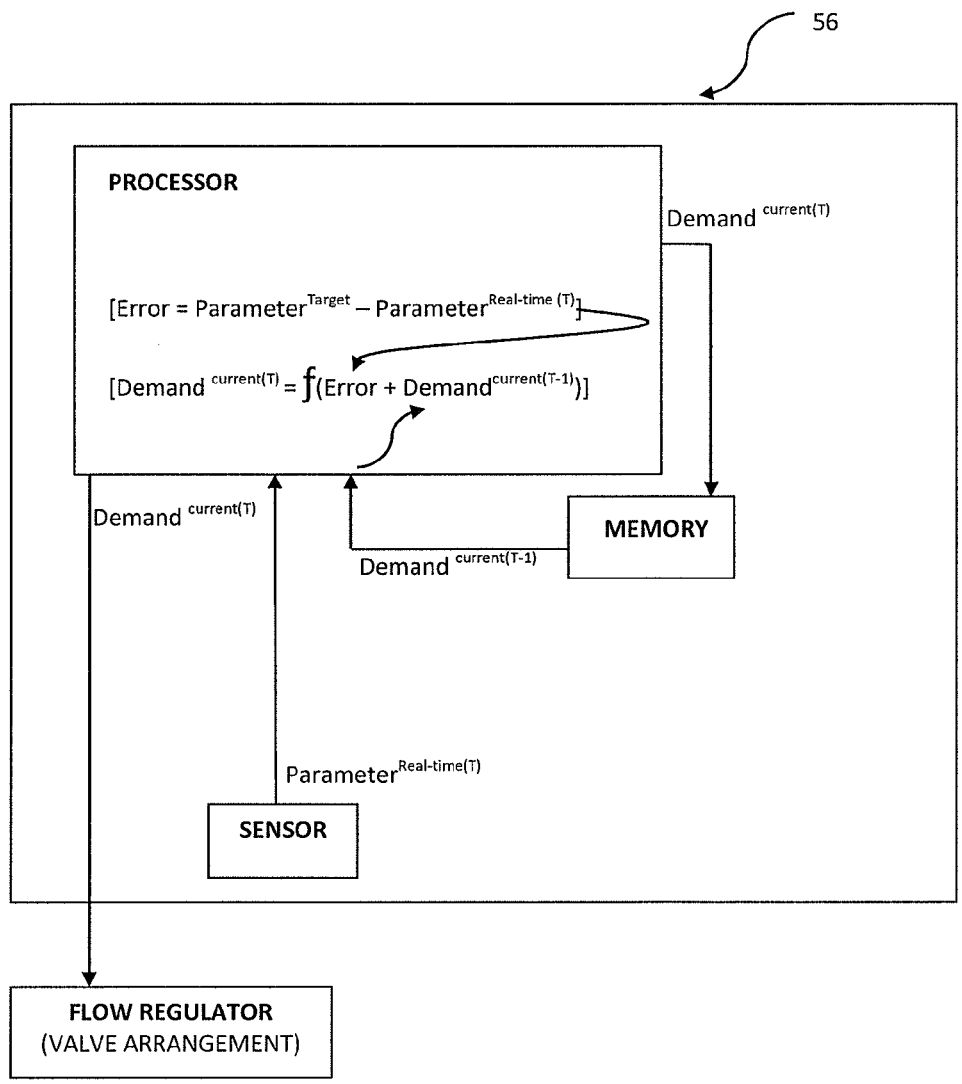
FIG. 6 shows schematically a closed-loop controller according to embodiments of the present application.
Figure 7:
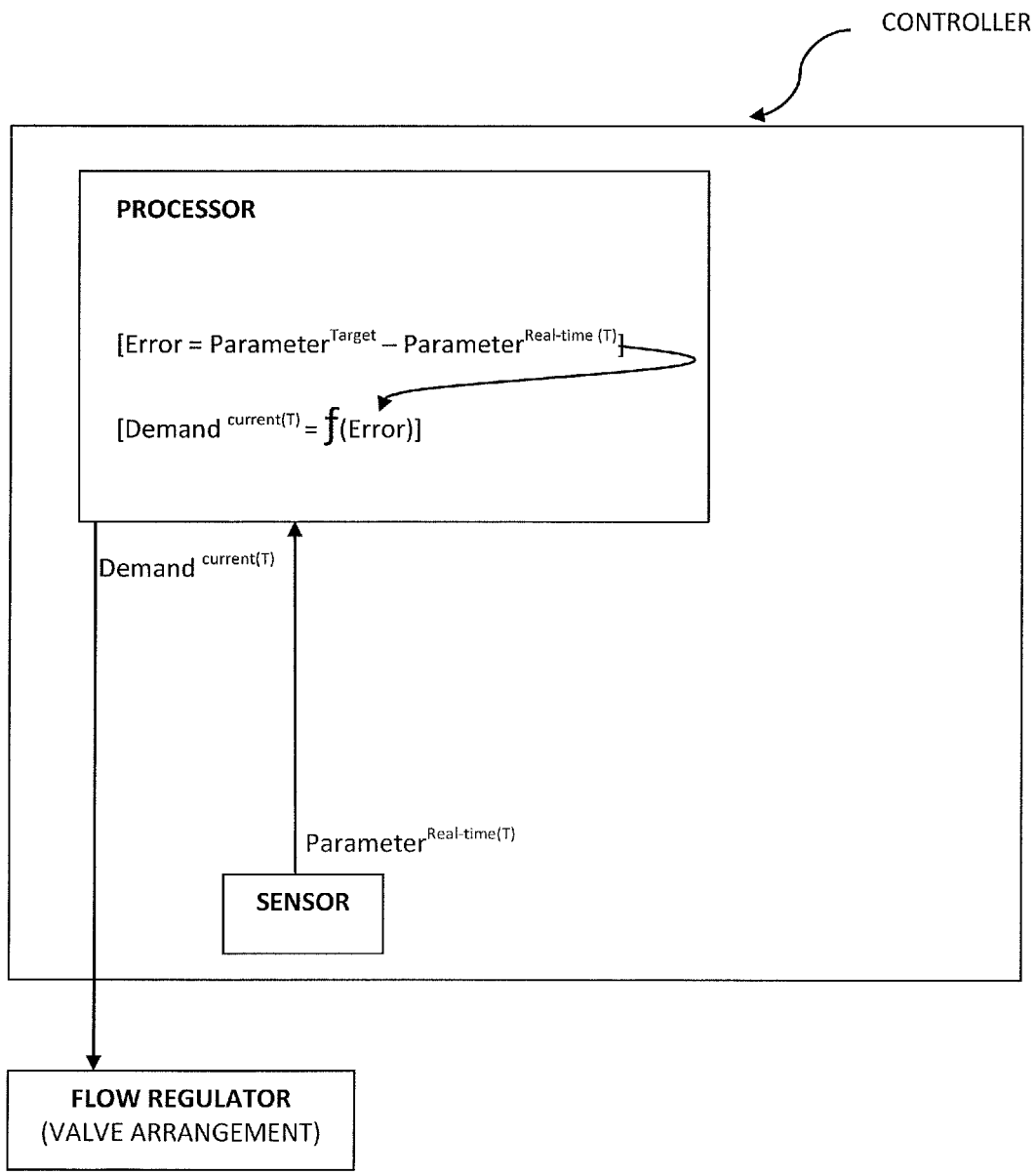
FIG. 7 shows schematically a controller according to the conventional system of FIG. 2.

FIG. 4 shows schematically a closed loop controller according to a third embodiment. The third embodiment is similar to the second embodiment. Thus, the measured engine variables can again include the temperatures $T_{HX}$, $T_{30}$ (from which $T_A$, $T_B$ can be determined, as discussed above) and $T_{26}$. However, in the third embodiment, a disc stress calculator unit 52 calculates one or more stresses in the disc based on estimated temperatures in the disc. The controller 56 can then adjust the flow of cooled cooling air according to engine conditions to control disc stress. The stress calculation can be accomplished using a reduced order model. Considering a finite thermal model:

$$\frac{DT}{Dt} = \alpha \nabla^2 T + \frac{\dot{q}}{\rho c}$$

where T is temperature, t is time, $\alpha$ is thermal diffusivity, $\dot{q}$ is heat flow rate, $\rho$ is density and c is specific heat capacity, integrating over the volume of the disc yields:

$$\int_V \frac{DT}{Dt} dV = \int_V \alpha \nabla^2 T \, dV + \int_V \frac{\dot{q}}{\rho c} dV$$

Applying divergence theorem simplifies the above to:

$$\int_V \frac{DT}{Dt} dV = \alpha \int_S \nabla T \cdot n \, dS + \frac{d}{dT} \int_V \frac{\dot{q}}{\rho c} dV$$

The disc is axisymmetric and thus in a volume element of the discretized disc it is only necessary two consider two dimensions. The temperature of such a volume element, $V_{i,j}$, (shown schematically in FIG. 4) is given by:

$$\frac{dT_{i,j}}{dt} V_{i,j} = \alpha \int_S \left( \frac{\partial T}{\partial x} i + \frac{\partial T}{\partial y} j \right) \cdot n \, dS + \frac{d}{dt} \int_V \frac{Q}{\rho c} dV$$

$$\frac{dT_{i,j}}{dt} V_{i,j} =$$

$$\alpha \left[ -\frac{T_{i,j} - T_{i,j-1}}{\Delta x} \Delta y - \frac{T_{ij} - T_{i,j+1}}{\Delta x} \Delta y - \frac{T_{i,j} - T_{i,j-1}}{\Delta y} \Delta x - \frac{T_{i,j} - T_{i,j+1}}{\Delta y} \Delta x \right] +$$

$$\ldots \frac{k(T_{i,j} - T_{i,j-1})}{\rho c} + \frac{k(T_{i,j} - T_{i,j+1})}{\rho c} + \frac{k(T_{i-1,j} - T_{i,j})}{\rho c} + \frac{k(T_{i+1,j} - T_{i,j})}{\rho c}$$

where k is thermal conductivity. Such a model, together with the boundary conditions on the blade geometry, can form a large dimensional state-space model of the type:

$$\frac{dx}{dt} = Ax + Bu \quad (1)$$

where:

$$x = \begin{bmatrix} T_{1,1} \\ T_{1,2} \\ \vdots \\ T_{i,j} \\ \vdots \\ T_{m,n} \end{bmatrix},$$

A is the matrix of coefficients, and $$u = \begin{bmatrix} T_A \\ T_B \\ T_{26} \end{bmatrix}$$

is a set of inputs that provide the temperatures of the surrounding air to the disc. The matrix B can be derived by applying Dirichlet and/or Neumann boundary conditions to the surface of the discretized disc.

The state-space model has a large number of states, depending on the number of finite volume elements over which the disc discretized, and can thus be computationally very intensive. This can lead to difficulties in the real-time implementation. However, we are not necessarily interested in the temperatures of all the volume elements but rather in stresses at specific life limiting points on the disc caused by the disc temperatures. We can thus define the stress output variables by:

$$\sigma = Cx \quad (2)$$

where $\sigma$ are the output stresses at selected life limiting points on the disc, and C is a matrix of coefficients. For example, if it is desired to know the local thermal stress between two adjacent volume elements, then the stress may be determined as a constant times the temperature difference between the two elements.

Applying a model reduction technique, of a type known to the skilled person, to the system defined by (1) and (2) allows the derivation of a suitable reduced order model that predicts with reasonable accuracy the disc temperature distribution and thermal stresses at points corresponding to the σ=Cx relationship.

As with the previous embodiments, the control unit 56 can implement a simple PI controller or a more sophisticated transfer function. However, another option, which may be particularly advantageous when a number of stress states are calculated, is to integrate functions of the comparator 54 and control unit 56 such that a state-feedback controller, e.g. incorporating a Kalman filter, acts directly on the stress states from the stress model. A feedback gain matrix can be derived using LQR/LQG methodology and applied to state vector to determine the valve settings.

Overall, by regulating the cooled cooling air flow on the basis of measured or estimated disc temperatures, or on the basis of stresses at life limiting points on the disc, the disc can be e.g. operated at close to optimal conditions, helping to improve the overall efficiency of the engine, or cooled more effectively for the same amount of cooling air, allowing the engine to be operated to be run for longer before each off-wing overhaul.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A gas turbine engine having, in flow series, a compressor section, a combustor, and a turbine section, and further having:
    a cooling system which diverts an air flow received from the compressor section to a heat exchanger and then to the turbine section to cool a component thereof, the air flow by-passing the combustor and being cooled in the heat exchanger, and the cooling system having a valve arrangement which regulates the air flow downstream of the heat exchanger; and
    a closed-loop controller apparatus operable to control operation of the valve arrangement by sending for a current time step of a series of time steps, a current demand signal, the closed-loop controller comprising:
    at least one sensor for monitoring a real-time parameter of the component over the series of time steps,
    a processor for calculating a demand signal at each time step to operate the valve arrangement to control the air flow,
    a memory for storing one or more most recent demand signals calculated at the most recent in the series of time steps,
    the processor configured for determining an error between a pre-defined target parameter and the real-time parameter sensed at the current time step and determining the current demand signal to cause the valve arrangement to control the air flow to address the error, wherein the step of determining the current demand signal involves a calculation using, the error and a most recent demand signal of the one or more most recent demand signals stored in the memory of the controller.

2. The gas turbine engine according to claim 1, wherein the at least one sensor monitors a temperature of the component, the gas turbine engine further having one or more temperature measuring devices adapted to measure the temperature of the component at one or more locations thereof.

3. The gas turbine engine according to claim 1, comprising one or more sensors adapted to measure at least the temperature of the air flow which has been cooled in the heat exchanger and the temperature of the air flow exiting the compressor section, the processor estimating a real-time temperature of the component on the basis of at least a measured temperature of the air flow which has been cooled in the heat exchanger, and a measured temperature of the air flow exiting the compressor section and using an estimate of the real-time temperature of the component as the real-time parameter for the purpose of determining the current demand signal.

4. The gas turbine engine according to claim 1, wherein the closed-loop controller apparatus monitors one or more stresses in the component.

5. The gas turbine engine according to claim 4, wherein the at least one sensor is a temperature sensor and the processor uses a reduced order model to calculate from temperatures sensed by the temperature sensor the one or more stresses in the component.

6. The gas turbine engine according to claim 1, wherein the component is a turbine disc.

7. The gas turbine engine according to claim 1, wherein the valve arrangement includes one or more switched vortex valves.

8. The gas turbine engine according to claim 1, wherein the heat exchanger is located in a bypass air stream of the gas turbine engine.

9. A method of operating a gas turbine engine having, in flow series, a compressor section, a combustor, and a turbine section, the method including the steps of:
    cooling the air flow in the heat exchanger by diverting an air flow received from the compressor section to a heat exchanger, by-passing the combustor, and then to the turbine section to cool a component thereof;
    monitoring a real-time parameter of the component over a series of time steps;
    calculating a demand signal at each time step configured to operate a valve arrangement to control the air flow;
    storing one or more demand signals calculated at a most recent in the series of time steps;
    determining a target parameter and an error between the target parameter and the real-time parameter and determining a current demand signal operable to cause the valve arrangement to control the air flow to address the error, wherein the step of determining the current demand signal involves a calculation using the most recent demand signal in the series of time steps and the error; and,
    communicating the current demand signal to the valve arrangement.

10. The method according to claim 9, further including a step of:
    measuring and/or estimating one or more temperatures of the component and
    determining one or more stresses in the component based on estimated and/or measured temperatures;
    determining a target stress and determining an error between a real-time stress and the target stress.

* * * * *